Figure 1:
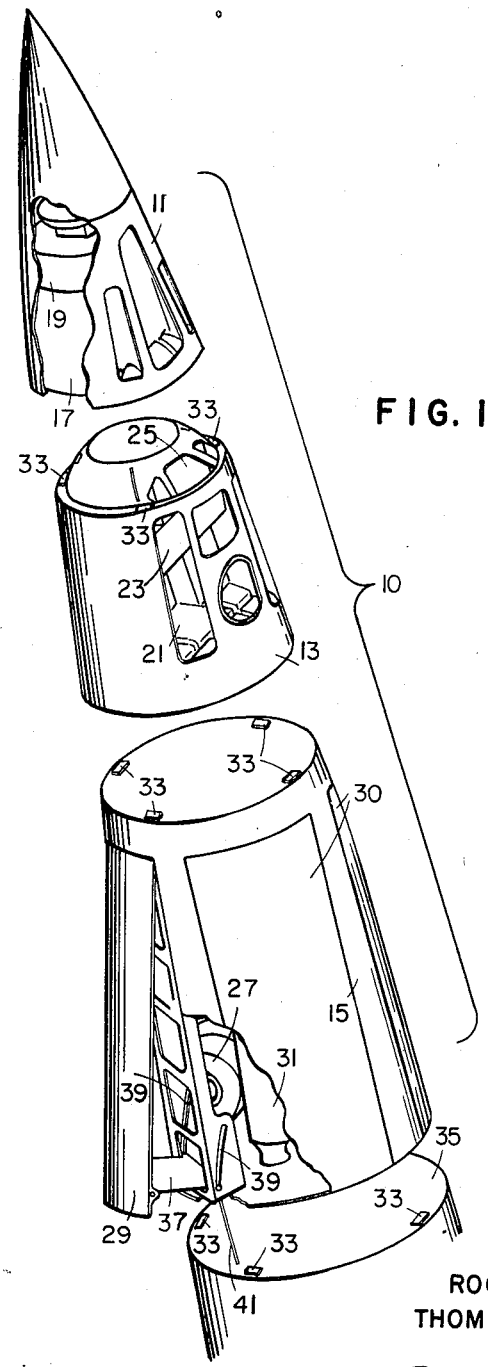

INVENTORS
ROGER K. LEE, JR.
THOMAS R. PARSONS

ATTORNEY

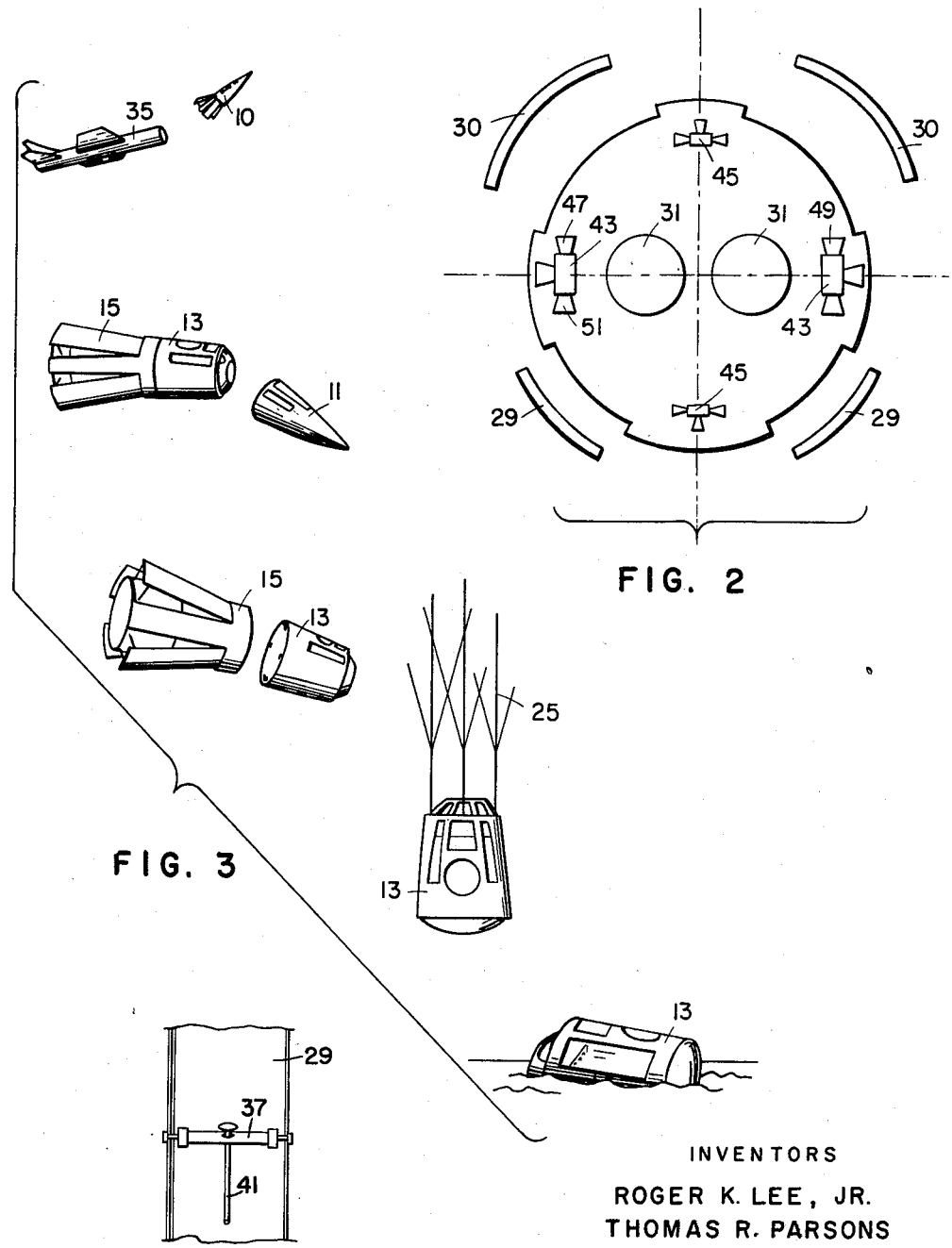

United States Patent Office 2,941,764
Patented June 21, 1960

2,941,764

FLAPS FOR SUPERSONIC AIRCRAFT ESCAPE SYSTEMS

Roger K. Lee, Jr., Lexington, Mass., and Thomas R. Parsons, Santa Monica, Calif., assignors to Electronics Corporation of America, Cambridge, Mass., a corporation of Massachusetts Filed Aug. 8, 1957, Ser. No. 676,959

3 Claims. (Cl. 244—140)

This invention relates to emergency escape means for aircraft in flight. Particularly this invention relates to emergency means for modern combat aircraft which can operate at a speed and height such that it would be extremely hazardous for the pilot or other occupant in an emergency to attempt to escape from the aircraft in the usual way even with the help of an ejection seat. When the pilot must leave the aircraft while it is at high altitude, bordering on a vacuum, or flying at high speeds several times that of sound, he faces death from a multiplicity of causes; when he is ejected at high altitude, the thin air not only fails to provide enough oxygen to sustain him but also provides for his ejection seat insufficient damping to prevent intolerable tumbling; when ejected from a high speed aircraft at lower altitude he is exposed to intolerable wind blast, while his poor aerodynamic shape causes excessive deceleration, leading to a disarrangement and destruction of his internal organs.

An escape system has been proposed which comprises an aircraft having a fuselage comprising a front section which is capable of being detached from a rear section of the fuselage in the event of an emergency. This front section forms a multi-staged escape system and is divisible into three main sub-sections which are separable from each other. The first section is the nose of the aircraft in front of the pilot, containing components of the fire control radar and autopilot. The second section is the survival capsule itself, incorporating the entire cockpit and containing the pilot, his survival gear and the parachute. The rear section carries within its four stabilizing flaps the pilot environment gear (air conditioning system, etc.), the separation and stabilization rockets, the aircraft's fire control and other electronic gear and the nose wheel.

The moment the pilot actuates the separation mechanism his retention harness is automatically tightened and the escape system, its three subsections still united as in flight, is severed from the rest of the aircraft immediately behind the flaps by the action of the decoupling devices placed at all major connections. A high thrust separation rocket pushes the system away from the rest of the aircraft, its energy acting through a mechanical linkage forces the flaps open, and immediately the rockets which compensate for the initial pitch and roll motions to prevent tumbling are actuated.

The principal object of this invention is to enable this escape system to include escape from very low altitudes.

In accordance with this invention the configuration of the flaps is such that with the aid of the separation rocket the entire system first zooms upward, thus enabling it to achieve additional height in case of a low altitude escape to clear the aft section since this may be moving forward at a greater velocity that the system itself.

When the system is falling freely and an altitude below fifty thousand feed and a g-load of less than eight g's is reached, the nose section is severed, and due to the higher drag of the blunt nose of the survival capsule, further deceleration occurs. Forward speed at this time will be slightly in excess of Mach 1 for most conditions. When the capsule, with its stabilization flaps, has fallen farther to an altitude of twenty thousand feet, and the negative g-load on the pilot has decreased to less than two g's, the flap section is disconnected, and the survival capsule now falls through air sufficiently dense to preclude excessive tumbling, until it reaches its terminal velocity of Mach 0.35. Then the parachute opens, allowing the capsule and its pilot to descend safely to earth.

The above sequence is altered only for that case where separation occurs below five thousand feet. In this case the capsule still zooms upward upon separation due to its flap configuration, but instead of using an altitude and g-load indication to determine the times at which the nose and flap sections should be jettisoned, the system jettisons both when the apex of the zoom-up trajectory is reached. In this manner, the system attains its light-weight, high-drag condition at the most favorable point, making it possible to deploy the parachute with as much altitude rise as possible. With this arrangement, it is possible for the pilot to escape safely at very low altitude provided his forward velocity is at least Mach 0.8.

Other and incidental objects of this invention will be apparent to those skilled in the art from a reading of the specification and an inspection of the accompanying drawings in which:

Figure 1 illustrates an escape capsule in accordance with the present invention, Figure 2 is a rear view of the escape capsule shown in Figure 1, Figure 3 illustrates the escape sequence of an escape capsule from a high altitude down to ground, and Figure 4 shows a detail of the escape capsule of Figure 1.

Referring now to Figure 1, there is shown the entire escape system 10 which forms the front section of the fuselage of an aircraft and which comprises three sub-sections: a nose section 11, a survival capsule 13, and a flap section 15. The nose section 11 encloses the automatic pilot 17 and the radar equipment 19. The escape-capsule 13 encloses the pilot seat 21, the instrument console 23, the parachute 25, as well as the survival gear and the escape sequence controls. The flap section 15 includes the nose wheel 27, the stabilization flaps 29 and 30, the separation rockets 31, and the stabilization rockets (not shown on Figure 1). The three sub-sections 11, 13 and 15 are structurally connected together by means of explosive bolts 33. The three sub-sections 11, 13 and 15 form the front end of the fuselage of an aircraft, which front end is structurally connected to the aft section 35 of the fuselage by means of explosive bolts 33. The explosive bolts 33 are used to separate the several sections and sub-sections of the aircraft from each other.

In order to make the escape system effective for low altitude escape, and also to enable it to move out of the line of flight of the aft section 35 of the fuselage upon separation, the system must be provided with zoom-up capability. In order to accomplish this, the system employs two pairs of flaps 29 and 30. The two lower flaps 29 have an arc of forty degrees and when opened make an angle of only ten degrees with the longitudinal axis of the fuselage. The two upper flaps 30, while having the same length as the lower flaps 29, are wider, with an arc of sixty degrees and when opened make an angle of fifteen degrees with the longitudinal axis of the fuselage. The asymmetric flap configuration induces a positive angle of attack to the system with resultant lift and climb. Thus the system will zoom upward upon separation until it reaches the apex of its climb and the parachute is deployed at the maximum altitude possible.

The flaps are deployed at separation by means of a mechanical linkage which is operated by utilizing a portion of the energy of the separattion rockets 31. Each flap is hinged to the air frame at its forward end and to a movable link at its after end. This link is connected to the flap at one end by a wide hinge 37 and its other end runs in a pair of curved tracks 39. The track end of the link is attached by a steel cable 41 to a block in the aft section 35 of the fuselage which holds the cable by spring-loaded jaws. These jaws are arranged to release the cable upon completion of separation and a latch (not shown) is provided which prevents the link from collapsing the flap after separation has occurred.

Reference is now made to Figure 2 which shows the asymmetrical configuration of the lower flaps 29 and the upper flaps 30. Figure 2 also shows the separation rockets 31.

Stabilization means must be provided both to prevent tumbling at the initiation of the escape sequence and to maintain stability during the system's free fall through the air. In addition, roll stabilization becomes vital for low altitude escape, since the zoom-up capability of the system can only be effective here if the system is so oriented that it always zooms upward rather than downward or laterally. At low and medium altitudes, the natural aerodynamics of the system design provides the necessary directional stability once the initial tumbling motion has been overcome. But stabilization against additional tumbling and roll and for the fall from high altitudes demands the use of propulsive techniques. For this purpose the aft end of the flap section 15 is provided with two sets 43 and 45 of six rockets each. Each rocket of the set 43 may have a twelve hundred pound thrust to overcome the strong tumbling moments present on separation and each rocket of the other set 45 may have a twenty-five pound thrust each for the supplementary stabilization during high-altitude escape. It is desirable to build the combustion chambers of these rockets in groups of three consisting a single assembly. These rockets may be used as follows: if pitch compensation to lift the nose is required, rockets 47 and 49 are employed, pushing the tail down, and thus creating a nose-lifting moment about the center of gravity. Should clockwise roll compensation be needed, it is provided by rockets 49 and 51. If the combination of roll, pitch and yaw motions must be counterbalanced, a suitable combination of rockets is employed.

Reference is now made to Figure 3 which shows the previously discussed escape sequence, namely, the initial separation of the escape system 10 from the aft section 35 of the fuselage with the deployment of the flaps, then the separation of the nose section 11, then separation of the flap section 15, the parachute descent, and the landing. Figure 4 shows the steel cable 41 which is attached to the end of hinge 37 remote from the flap 29.

The escape system herein described is thus capable of providing means for escape over virtually the entire range of flight conditions (excepting take-off) encountered by high-performance aircraft flying at supersonic speeds.

We claim:

1. An aircraft comprising a fuselage having a rear section and a front section capable of being detached from said rear section in an emergency, said front section comprising two upper and two lower flaps, the upper flaps being wider than the lower flaps, and means to deploy said flaps upon separation of said front section from said rear section.

2. An aircraft comprising a fuselage having a rear section and a front section capable of being detached from said rear section in an emergency, said front section comprising at least two upper and two lower flaps, and means to deploy said flaps to fixed positions upon separation of said front section from said rear section, the upper flaps when deployed making a greater angle with respect to the longitudinal axis of the fuselage than the lower flaps when deployed.

3. An aircraft comprising a fuselage having a rear section and a front section capable of being detached from said rear section in an emergency, said front section comprising at least two upper and two lower flaps, the upper flaps being wider than the lower flaps, and means to deploy said flaps to fixed positions upon separation of said front section from said rear section, the upper flaps when deployed making a greater angle with respect to the longitudinal axis of the fuselage than the lower flaps when deployed.

References Cited in the file of this patent

UNITED STATES PATENTS

| 2,377,742 | Archer | June 5, 1945 |
| 2,591,867 | Prower et al. | Apr. 8, 1952 |
| 2,702,680 | Heinemann et al. | Feb. 22, 1955 |
| 2,736,523 | Chaplin | Feb. 28, 1956 |
| 2,883,125 | Jarvis et al. | Apr. 21, 1959 |

FOREIGN PATENTS

| 699,290 | Great Britain | Nov. 4, 1953 |
| 702,148 | Great Britain | Jan. 13, 1954 |
| 702,149 | Great Britain | Jan. 13, 1954 |
| 731,660 | Great Britain | June 8, 1955 |
| 1,002,316 | France | Oct. 31, 1951 |